US012762603B2

(12) United States Patent
Moriwaki

(10) Patent No.: US 12,762,603 B2
(45) Date of Patent: Oct. 13, 2026

(54) INFORMATION PROCESSING DEVICE, DISPLAY SYSTEM, AND INFORMATION PROCESSING METHOD

(71) Applicant: Sharp Kabushiki Kaisha, Sakai City (JP)

(72) Inventor: Daisuke Moriwaki, Tokyo (JP)

(73) Assignee: SHARP DISPLAY SOLUTIONS, LTD., Tokyo (JP)

( * ) Notice: Subject to any disclaimer, the term of this patent is extended or adjusted under 35 U.S.C. 154(b) by 57 days.

(21) Appl. No.: 18/807,057

(22) Filed: Aug. 16, 2024

(65) Prior Publication Data

US 2024/0420217 A1 Dec. 19, 2024

Related U.S. Application Data

(63) Continuation of application No. PCT/JP2022/006710, filed on Feb. 18, 2022.

(51) Int. Cl.

| | |
|---|---|
| ***G06Q 30/0601*** | (2023.01) |
| ***G06F 3/14*** | (2006.01) |
| ***G06V 20/50*** | (2022.01) |
| ***G06V 40/10*** | (2022.01) |

(52) U.S. Cl.

CPC ........... *G06Q 30/0631* (2013.01); *G06F 3/14* (2013.01); *G06V 20/50* (2022.01); *G06V 40/10* (2022.01)

(58) Field of Classification Search

None

See application file for complete search history.

(56) References Cited

U.S. PATENT DOCUMENTS

2015/0371260 A1* 12/2015 Chan .................. G06Q 30/0271 705/14.51

FOREIGN PATENT DOCUMENTS

| | | | | | |
|---|---|---|---|---|---|
| CN | 119537637 | A | * | 2/2025 | ......... G06Q 30/0641 |
| JP | 2008276449 | A | * | 11/2008 | |
| JP | 2016009416 | A | * | 1/2016 | |
| JP | 2019045305 | A | * | 3/2019 | |
| JP | 2019057245 | A | * | 4/2019 | |
| JP | 2020071884 | A | * | 5/2020 | |

(Continued)

OTHER PUBLICATIONS

International Search Report in PCT/JP2022/006710 dated May 24, 2022 with English translation.

*Primary Examiner* — Florian M Zeender

(74) *Attorney, Agent, or Firm* — MCGINN INTELLECTUAL PROPERTY LAW GROUP, PLLC

(57) ABSTRACT

An information processing device includes a size acquisition unit configured to acquire a measurement result from a measurement device configured to measure a shoe size. The information processing device further includes a brand acquisition unit configured to acquire one or more brands of shoes of the shoe size measured. The information processing device further includes an extraction unit configured to extract a respective foot size corresponding to a respective combination of the shoe size with each of the one or more brands acquired, with reference to a data table that include a respective brand-specific set of shoe sizes and foot sizes, for each of the one or more brands. The information processing device further includes an identification unit configured to identify a respective brand-specific shoe size which corresponds to the respective foot size extracted, for each of the one or more brands.

7 Claims, 8 Drawing Sheets

(56) References Cited

FOREIGN PATENT DOCUMENTS

| | | | | | |
|---|---|---|---|---|---|
| JP | 2020095633 | A | * | 6/2020 | |
| WO | WO-2017026021 | A1 | * | 2/2017 | ............. G06Q 30/06 |

* cited by examiner

FIG. 4

| ACTUAL SHOE SIZE(cm) | 27.0 | 27.5 | 28.0 | 28.5 | 29.0 |
|---|---|---|---|---|---|
| A | 25.5 | 26.0 | 26.5 | 27.0 | 27.5 |
| B | 25.0 | 25.5 | 26.0 | 26.5 | 27.0 |
| C | 24.5 | 25.0 | 25.5 | 26.0 | 26.5 |
| D | 25.0 | 25.5 | 26.0 | 27.0 | 28.0 |

FIG. 5

| ACTUAL FOOT SIZE(cm) | 25.0 | 25.5 | 26.0 | 26.5 | 27.0 |
|---|---|---|---|---|---|
| A | 25.5 | 26.0 | 26.5 | 27.0 | 27.5 |
| B | 25.0 | 25.5 | 26.0 | 26.5 | 27.0 |
| C | 24.5 | 25.0 | 25.5 | 26.0 | 26.5 |
| D | 25.0 | 25.5 | 26.0 | 27.0 | 28.0 |

FIG. 6

| 26.5cm | SNEAKERS | RUNNING | BUSINESS | BOOTS | SANDALS |
|---|---|---|---|---|---|
| A | 2 | 3 | 0 | 0 | 0 |
| B | 3 | 5 | 0 | 2 | 1 |
| C | 5 | 0 | 3 | 0 | 0 |
| D | 2 | 3 | 2 | 2 | 1 |

INFORMATION PROCESSING DEVICE, DISPLAY SYSTEM, AND INFORMATION PROCESSING METHOD

TECHNICAL FIELD

The present invention relates to an information processing device, a display system, and an information processing method.

BACKGROUND ART

In retail stores that sell products to consumers, sales promotion activities are widely carried out by presenting advertisements for products displayed in the store to the consumers and linking the advertisements to their purchasing behavior.

On the other hand, in a shoe store, means for displaying advertisements related to shoes of an optimal size in the inventory to individual consumers who visit the store and linking the advertisements to purchasing behavior is not sufficient. Consumers who want to purchase shoes need to check all shelves themselves or with a store clerk to confirm whether or not there are shoes fitting their foot sizes and having their desired designs in the store. When consumers purchase shoes, they want to quickly reach a place where shoes suitable for their foot sizes as products in the inventory are displayed and easily go through a process in which they try the shoes on. However, even if consumers are aware that even if listed shoe sizes are the same, when brands are different, actual sizes of shoes may be different when actually worn, it is difficult for the consumers to determine which size fits their feet for each brand. Moreover, the consumer needs to wait when confirming the size with the clerk if the clerk is serving other customers.

Patent Document 1 describes a terminal device that allows a user to ascertain the feeling of size for a plurality of categories of clothing. However, in technology described in Patent Document 1, a shoe size differing according to each brand is not taken into account and it is difficult to ascertain shoes that fit the consumer's foot size for each brand.

CITATION LIST

Patent Document

[Patent Document 1]
Japanese Unexamined Patent Application, First Publication No. 2020-095633

SUMMARY OF INVENTION

Technical Problem

The problem to be solved is that consumers cannot ascertain which shoes fit their foot sizes because a shoe size differs according to each brand.

Solution to Problem

According to an aspect of the present invention, there is provided an information processing device including: a size acquisition unit configured to acquire a measurement result from a measurement device configured to measure a shoe size; a brand acquisition unit configured to acquire a brand of shoes of the measured shoe size; an extraction unit configured to extract a foot size corresponding to a combination of the shoe size and the acquired brand with reference to a data table in which brand-specific shoes and foot sizes are shown; and an identification unit configured to identify the shoe size corresponding to the extracted foot size according to each brand.

Moreover, according to an aspect of the present invention, there is provided a display system including: a measurement device configured to measure a shoe size; a brand acquisition unit configured to acquire a brand of shoes of the measured shoe size; an extraction unit configured to extract a foot size corresponding to a combination of the shoe size and the acquired brand with reference to a data table in which brand-specific shoes and foot sizes are shown; and an identification unit configured to identify the shoe size corresponding to the extracted foot size according to each brand.

Moreover, according to an aspect of the present invention, there is provided an information processing method including: acquiring a measurement result from a measurement device configured to measure a shoe size; acquiring a brand of shoes of the measured shoe size; extracting a foot size corresponding to a combination of the measured shoe size of a consumer and the acquired brand with reference to a data table in which brand-specific shoes and foot sizes are shown; and identifying the shoe size corresponding to the extracted foot size according to each brand.

Advantageous Effects of Invention

According to the present invention, consumers can ascertain shoes fitting their foot sizes even though a shoe size differs according to each brand.

BRIEF DESCRIPTION OF DRAWINGS

FIG. 4 is a schematic diagram showing a data structure of a first data table and an example of data according to the embodiment of the present invention.

FIG. 5 is a schematic diagram showing a data structure of a second data table and an example of data according to the embodiment of the present invention.

FIG. 6 is a schematic diagram showing a data structure of an inventory status table and an example of data according to the embodiment of the present invention.

DESCRIPTION OF EMBODIMENTS

Hereinafter, an embodiment of the present invention will be described.

Figure 1:
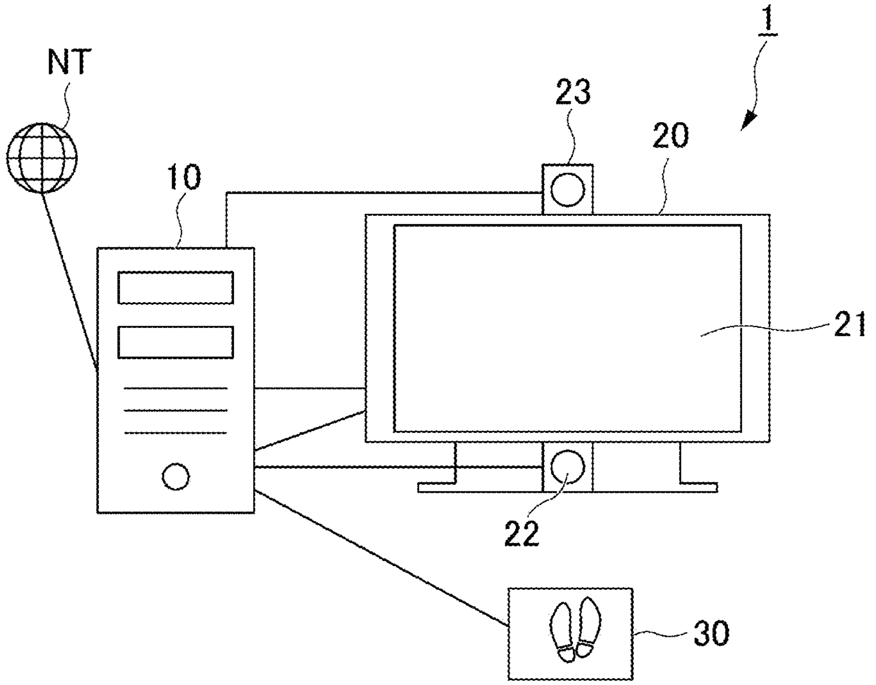
FIG. 1 is a schematic configuration diagram showing a configuration of the display system in an embodiment of the present invention.

FIG. 1 is a schematic configuration diagram showing a configuration of a display system in the embodiment of the present invention. In the present embodiment, a display system 1 is a system for displaying and controlling the display of content displayed on an electronic signboard such as digital signage. The content is for advertising. The content may be a still image or a moving image and may or may not have sound. In the present embodiment, digital signage configured to display content of advertisements related to products to be sold at a store that sells shoes will be described as an example.

In FIG. 1, the display system 1 includes an information processing device 10, a digital signage device 20, and a measurement device 30. The digital signage device 20 includes a display device 21, a first imaging device 22, and a second imaging device 23. The information processing device 10 and the digital signage device 20 or the measurement device 30 make a communication connection through a wired or wireless local area network (LAN) or serial communication. Moreover, the information processing device 10 and the display device 21 are connected via a video cable through which a video signal is delivered. Moreover, the information processing device 10 can be connected to the Internet NT.

The information processing device 10 is a computer that controls a display process of the display device 21. For example, the information processing device 10 outputs a video signal of content to the display device 21 and causes the display device 21 to display the content.

The digital signage device 20 is provided in the vicinity of the entrance to a store that sells shoes.

The display device 21 is digital signage that displays content for advertising on a display screen.

The first imaging device 22 generates a first captured-image by imaging shoes (footsteps) worn by a consumer when the consumer visiting the store has gotten on a measurement device 30 and transmits the generated first captured-image to the information processing device 10.

When the consumer visiting the store has gotten on the measurement device 30, the second imaging device 23 images the whole body of the consumer to generate a second captured-image and transmits the generated second captured-image to the information processing device 10.

The measurement device 30 is provided in the vicinity of the display device 21 at a store that sells shoes. More specifically, the measurement device 30 is arranged at a position where a display screen of the display device 21 can be viewed and a manipulation input on the display device 21 can be made. For example, the measurement device 30 is arranged at a position including an area corresponding to the footsteps when the consumer is standing toward the display screen of the display device 21.

The measurement device 30 includes a sensor configured to detect a foot size of the consumer and a sensor configured to detect that the consumer has gotten on the measurement device 30. Because the sensor is plate-shaped or sheet-shaped, a height from the floor surface to the upper surface of the sensor is not so high. Therefore, when the consumer stands in front of the display device 21, the consumer can stand on the sensor without being excessively conscious of the height of the sensor.

One or more imaging devices are provided in the sensor of the measurement device 30 and a longitudinal length and horizontal length of the consumer's foot are measured by scanning the sole of the consumer's foot standing on the sensor. When the consumer visits the store with shoes on, the measurement device 30 can measure the soles of the feet (soles of the shoes) with the shoes on. When the consumer visiting the store stands on the sensor in a state in which the consumer has taken off shoes, the measurement device 30 can measure the soles of the feet with the shoes off.

The measurement device 30 measures a size in either a state in which the consumer is wearing shoes or a state in which the consumer has taken off shoes.

Figure 2:
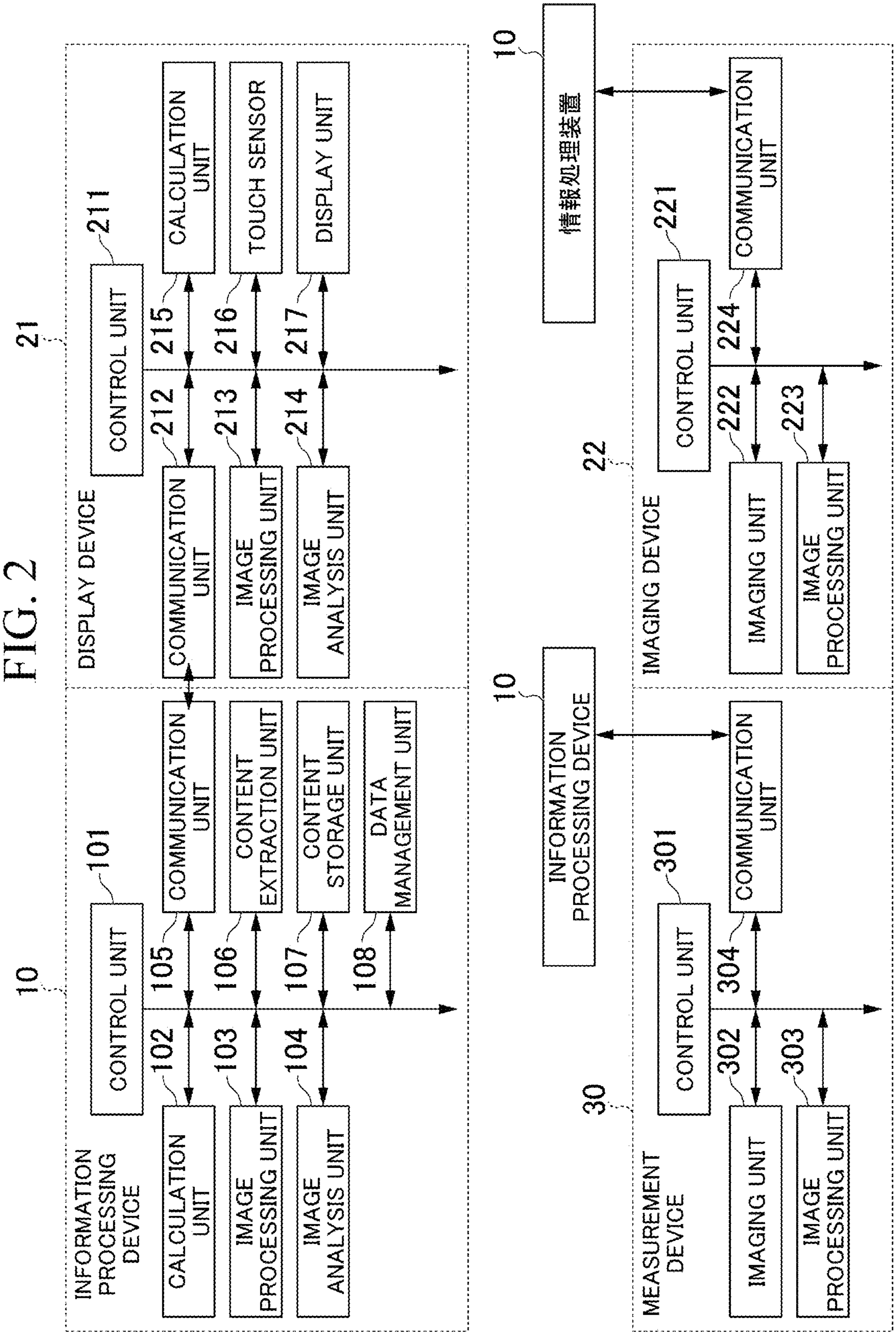
FIG. 2 is a schematic block diagram showing a configuration of equipment included in the display system according to the embodiment of the present invention.

FIG. 2 is a schematic block diagram showing a configuration of equipment provided in the display system in the embodiment of the present invention. In FIG. 2, the information processing device 10 includes a control unit 101, a calculation unit 102, an image processing unit 103, an image analysis unit 104, a communication unit 105, a content extraction unit 106, a content storage unit 107, and a data management unit 108.

The control unit 101 generally controls the information processing device 10. A detailed configuration of the control unit 101 will be described below.

The calculation unit 102 executes a calculation process in accordance with an instruction of the control unit 101.

The image processing unit 103 executes image processing in accordance with an instruction of the control unit 101.

The image analysis unit 104 executes an image analysis process in accordance with an instruction of the control unit 101.

The communication unit 105 communicates with other equipment such as the display device 21, the first imaging device 22, the second imaging device 23, or the measurement device 30.

The content extraction unit 106 extracts content of advertisements displayed on the display device 21.

The content storage unit 107 stores the content of the advertisements displayed on the display device 21.

The data management unit 108 stores various types of data for display control of the display device 21. For example, the data management unit 108 stores a first data table and a second data table in which brand-specific shoe sizes and foot sizes are shown. Moreover, the data management unit 108 stores an inventory status table indicating the inventory status at the store.

The display device 21 includes a control unit 211, a communication unit 212, an image processing unit 213, an image analysis unit 214, a calculation unit 215, a touch sensor 216, and a display unit 217.

The control unit 211 generally controls the display device 21.

The communication unit 212 communicates with the information processing device 10.

The image processing unit 213 executes image processing in accordance with an instruction of the control unit 211.

The image analysis unit 214 executes an image analysis process in accordance with an instruction of the control unit 211.

The calculation unit 215 executes a calculation process in accordance with an instruction of the control unit 211.

The touch sensor 216 is installed on the display screen of the display unit 217 and receives a manipulation input from the consumer. For example, when the touch sensor 216 receives a touch manipulation input from the consumer, the touch sensor 216 transmits coordinate data indicating a position on the touched display screen to the information processing device 10 via the communication unit 212.

The display unit 217 displays a video based on a video signal input from the information processing device 10.

The measurement device 30 includes a control unit 301, an imaging unit 302, an image processing unit 303, and a communication unit 304.

The control unit 301 generally controls the measurement device 30.

The imaging unit 302 includes one or more imaging devices configured to scan the soles of the consumer's feet (shoes) standing on the measurement device 30.

The image processing unit 303 executes image processing and measures the size of the consumer's foot (the longitudinal length and horizontal length of the consumer's foot) from the sole of the consumer's foot (shoe) scanned by the imaging unit 302.

The communication unit 304 communicates with the information processing device 10. For example, the communication unit 304 transmits the measured size of the consumer's foot (shoe) to the information processing device 10.

The first imaging device 22 includes a control unit 221, an imaging unit 222, an image processing unit 223, and a communication unit 224.

The control unit 221 generally controls the first imaging device 22.

The imaging unit 222 images a consumer standing on the measurement device 30.

The image processing unit 223 executes image processing and generates an image captured by the imaging unit 222.

The communication unit 224 communicates with the information processing device 10. For example, the communication unit 224 transmits the generated captured-image to the information processing device 10.

Because a configuration of the second imaging device 23 is similar to that of the first imaging device 22, description thereof will be omitted.

Figure 3:
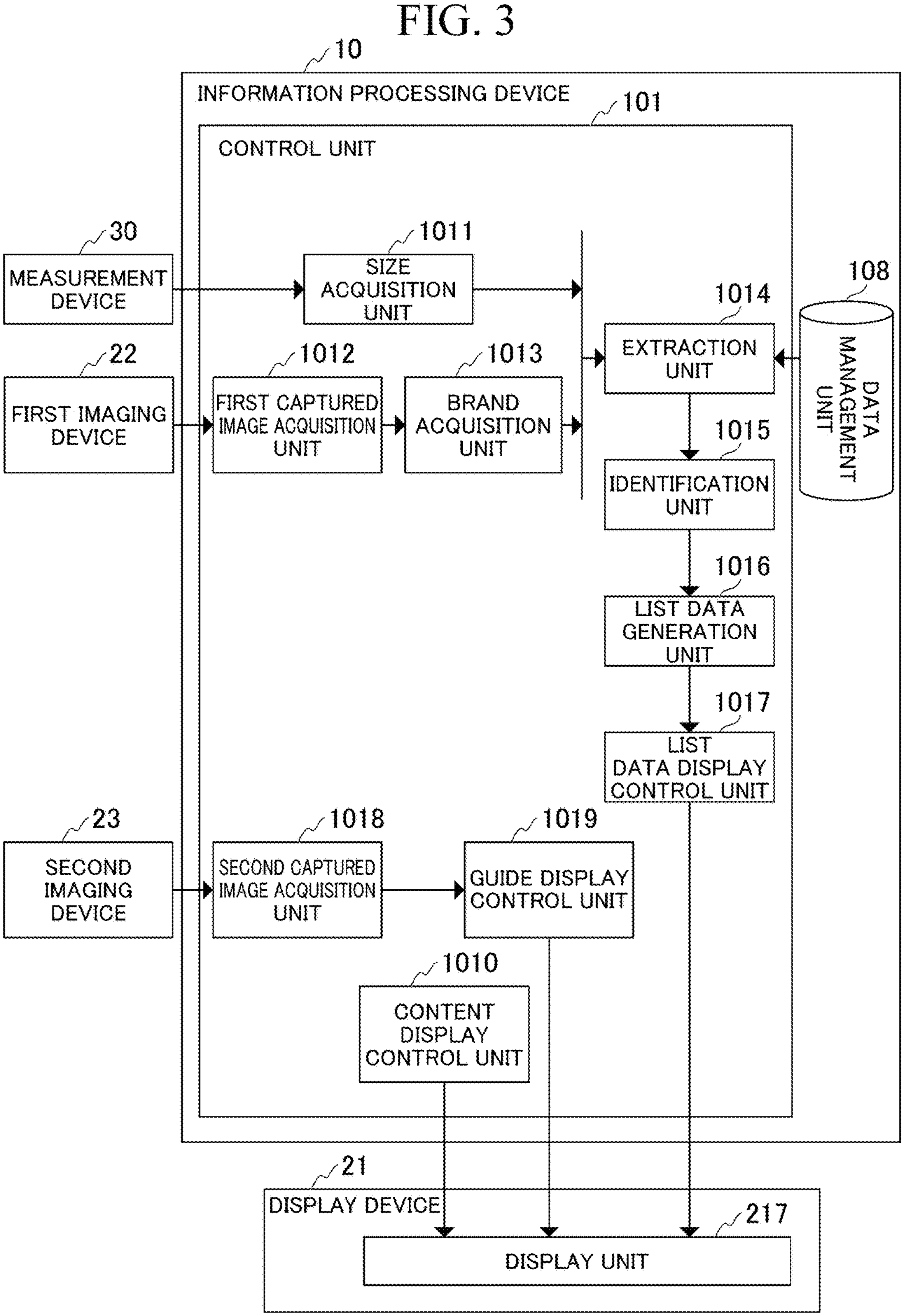
FIG. 3 is a schematic block diagram showing a configuration of a control unit of the information processing device according to the embodiment of the present invention.

FIG. 3 is a schematic block diagram showing a configuration of the control unit of the information processing device according to the embodiment of the present invention.

The control unit 101 includes a size acquisition unit 1011, a first captured-image acquisition unit 1012, a brand acquisition unit 1013, an extraction unit 1014, an identification unit 1015, a list data generation unit 1016, a list data display control unit 1017, a second captured-image acquisition unit 1018, a guide display control unit 1019, and a content display control unit 1010.

The size acquisition unit 1011 acquires a foot (shoe) size of the consumer from the measurement device 30 via the communication unit 105.

The first captured-image acquisition unit 1012 receives and acquires a first captured-image obtained by imaging shoes worn by the consumer from the first imaging device 22 via the communication unit 105.

The brand acquisition unit 1013 acquires a brand of shoes whose size is measured on the basis of the acquired first captured-image.

The extraction unit 1014 extracts a foot size corresponding to a combination of a result of measuring the size of the shoes worn by the consumer and the acquired brand with reference to a data table in which brand-specific shoes and foot sizes are shown.

The identification unit 1015 identifies at least a shoe size of a brand different from the acquired brand, wherein the shoe size corresponds to the extracted foot size.

The list data generation unit 1016 generates shoe list data corresponding to the identified brand-specific shoe size and the brand.

The list data display control unit 1017 causes the display unit 217 to display the generated list data. At this time, the list data display control unit 1017 may display the shoe list data in a different display mode for each category of shoes.

The second captured-image acquisition unit 1018 receives and acquires a second captured-image obtained by imaging the consumer's whole body from the second imaging device 23 via the communication unit 105.

The guide display control unit 1019 causes the display unit 217 to display a guide for a display area where shoes selected by the consumer from the list data are displayed. At this time, the guide display control unit 1019 may texture-map the selected shoe image onto the consumer's shoe in the second captured-image and display a virtually coordinated image together with the guide.

When there is no consumer on the measurement device 30, the content display control unit 1010 reads content of an advertisement extracted by the content extraction unit 106 from the content storage unit 107 and causes the display unit 217 to display the read advertisement content.

FIG. 4 is a schematic diagram showing a data structure of a first data table and an example of data according to the embodiment of the present invention.

As shown in FIG. 4, the first data table shows the consumer's foot size (of which a unit is "centimeters (cm)") for the actual shoe size (of which a unit is "cm") according to each brand. The actual shoe size is the shoe size measured by the measurement device 30.

In the example shown in FIG. 4, for the actual shoe size "27.0," the brand "A" is "25.5," the brand "B" is "25.0," the brand "C" is "24.5," and the brand "D" is "25.0." Moreover, for the actual shoe size "27.5," the brand "A" is "26.0," the brand "B" is "25.5," the brand "C" is "25.0," and the brand "D" is "25.5." Moreover, for the actual shoe size "28.0," the brand "A" is "26.5," the brand "B" is "26.0," the brand "C" is "25.5," and the brand "D" is "26.0." Moreover, for the actual shoe size "28.5," the brand "A" is "27.0," the brand "B" is "26.5," the brand "C" is "26.0," and the brand "D" is "27.0." Moreover, for the actual shoe size "29.0," the brand "A" is "27.5," the brand "B" is "27.0," the brand "C" is "26.5," and the brand "D" is "28.0."

FIG. 5 is a schematic diagram showing a data structure of a second data table and an example of data according to the embodiment of the present invention.

As shown in FIG. 5, the second data table shows a brand-specific shoe size (of which a unit is "cm") for the actual foot size (of which a unit is "cm"). The actual foot size is the consumer's foot size extracted from the shoe size measured by the measurement device 30 with reference to the first data table.

In the example shown in FIG. 5, for the actual foot size "25.0," the brand "A" is "25.5," the brand "B" is "25.0," the brand "C" is "24.5," and the brand "D" is "25.0" for the actual size "25.0." Moreover, for the actual foot size "25.5," the brand "A" is "26.0," the brand "B" is "25.5," the brand "C" is "25.0," and the brand "D" is "25.5." Moreover, for the actual foot size "26.0," the brand "A" is "26.5," the brand "B" is "26.0," the brand "C" is "25.5," and the brand "D" is "26.0." Moreover, for the actual foot size "26.5," the brand "A" is "27.0," the brand "B" is "26.5," the brand "C" is "26.0," and the brand "D" is "27.0." Moreover, for the actual foot size "27.0," the brand "A" is "27.5," the brand "B" is "27.0," the brand "C" is "26.5," and the brand "D" is "28.0."

Although the brand-specific size is shown in the example shown in FIG. 5, the data management unit 108 may store the second data table indicating a category-specific size even in the case of the same brand.

FIG. 6 is a schematic diagram showing a data structure of an inventory status table and an example of data according to the embodiment of the present invention.

As shown in FIG. 6, the inventory status table shows the number of category-specific shoes in the inventory according to each brand for the shoe size (of which a unit is "cm"). The data management unit 108 stores an inventory status table for each shoe size.

In the example shown in FIG. 6, for the shoe size "26.5," in the brand "A," an inventory quantity in the category "sneakers" is "2," an inventory quantity in the category "running" is "3," an inventory quantity in the category "business" is "0," an inventory quantity in the category "boots" is "0," an inventory quantity in the category "sandals" is "0." In the brand "B," an inventory quantity in the category "sneakers" is "3," an inventory quantity in the category "running" is "5," an inventory quantity in the category "business" is "0," an inventory quantity in the category "boots" is "2," an inventory quantity in the category "sandals" is "1." In the brand "C," an inventory quantity in the category "sneakers" is "5," an inventory quantity in the category "running" is "0," an inventory quantity in the category "business" is "3," an inventory quantity in the category "boots" is "0," an inventory quantity in the category "sandals" is "0." In the brand "D," an inventory quantity in the category "sneakers" is "2," an inventory quantity in the category "running" is "3," an inventory quantity in the category "business" is "2," an inventory quantity in the category "boots" is "2," an inventory quantity in the category "sandals" is "1."

Next, an operation of the display system 1 will be described.

Figure 7:
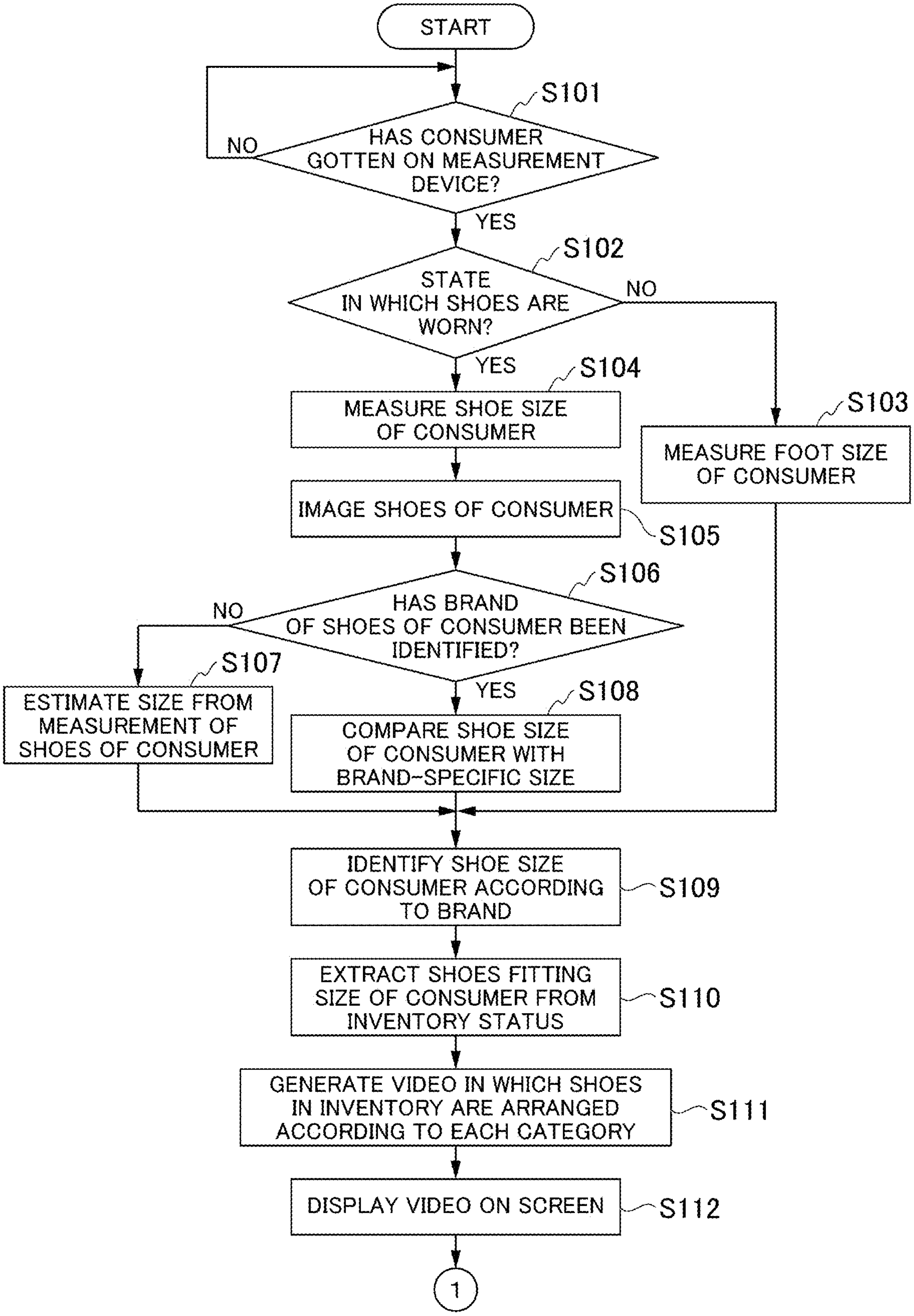
FIG. 7 is a flowchart showing an operation of a list display process executed by the display system according to the embodiment of the present invention.

FIG. 7 is a flowchart showing an operation of a list display process executed by the display system according to the embodiment of the present invention.

The display unit 217 of the display device 21 usually displays content of advertisements. The advertisement displayed by the display unit 217 may be any advertisement as long as it is for sales promotion. The information processing device 10 executes a process shown in FIG. 7 when the display unit 217 is displaying the content of the advertisements.

First, the size acquisition unit 1011 of the information processing device 10 determines whether or not the consumer has gotten on the measurement device 30 on the basis of a signal received from the measurement device 30 (step S101). When the sensor detects that the consumer has gotten on the measurement device 30, the measurement device 30 transmits a signal indicating that the consumer has gotten on the measurement device 30 to the information processing device 10. When the consumer has not gotten on the measurement device 30 (step S101: No), the processing of step S101 is iterated.

On the other hand, when the consumer has gotten on the measurement device 30 (step S101: Yes), the size acquisition unit 1011 determines whether or not the consumer has gotten on the measurement device 30 while wearing shoes (step S102). For example, the size acquisition unit 1011 may be configured to identify whether measurement has been performed in a state in which the consumer has worn the shoes or a state in which the consumer has taken off the shoes by displaying a screen for selecting whether to wear the shoes or take off the shoes on the display unit 217 and receiving a manipulation input from the consumer to the touch sensor 216. Moreover, when a logo, mark, figure, or the like indicating a shoe brand has been detected from the first captured-image on the basis of the first captured-image obtained by imaging feet during measurement, the size acquisition unit 1011 may determine that measurement has been performed in a state in which the shoes have been worn.

When the consumer has gotten on the measurement device 30 with the shoes off (step S102: No), the measurement device 30 measures a foot size of the consumer (step S103). The size acquisition unit 1011 of the information processing device 10 acquires the size measured by the measurement device 30 as the foot size of the consumer and then the process proceeds to the processing of step S109.

On the other hand, when the consumer has gotten on the measurement device 30 while wearing shoes (step S102: Yes), the measurement device 30 measures the shoe size of the consumer (step S104). The size acquisition unit 1011 of the information processing device 10 acquires the size measured by the measurement device 30 as the shoe size of the consumer. Subsequently, the first imaging device 22 images the consumer's footsteps and generates a first captured-image of the shoes worn by the consumer (step S105). The first captured-image acquisition unit 1012 of the information processing device 10 acquires a first captured-image obtained by imaging the consumer's feet during measurement from the first imaging device 22. Also, the brand acquisition unit 1013 determines whether or not a brand of shoes worn by the consumer can be identified on the basis of the acquired first captured-image (step S106). For example, the brand acquisition unit 1013 identifies the brand of the shoes by detecting a logo, mark, figure, or the like indicating the brand of the shoes from the first captured-image. At this time, when there is no match with the brand shoe data held in the information processing device 10, the brand acquisition unit 1013 may search the Internet to identify the brand of the shoes. Moreover, the brand acquisition unit 1013 may identify the brand of shoes worn by the consumer by displaying a screen for selecting the brand of shoes being worn on the display unit 217 and receiving a manipulation input from the consumer to the touch sensor 216.

When the brand of shoes worn by the consumer cannot be identified (step S106: No), the identification unit 1015 estimates a foot size from the measured shoe size (step S107) and the process proceeds to the processing of step S109.

On the other hand, if the brand of shoes worn by the consumer can be identified (step S106: Yes), the extraction unit 1014 compares the size of the shoes worn by the consumer with each brand-specific size with reference to the first data table and extracts a foot size of the consumer (step S108). For example, the extraction unit 1014 designates the foot size of the consumer as 26.5 cm with reference to the first data table when the measured shoe size of the consumer is 28.0 cm and the identified brand is "A."

Subsequently, the identification unit 1015 identifies a brand-specific shoe size fitting the foot size of the consumer with reference to the second data table (step S109). For example, when the consumer's foot size is 26.5 cm, the identification unit 1015 identifies that the brand "A" is 27.0 cm, the brand "B" is 26.5 cm, the brand "C" is 26.0 cm, and the brand "D" is 27.0 cm. Also, the identification unit 1015 extracts shoes fitting the foot size of the consumer from the inventory status (step S110). Specifically, the identification unit 1015 extracts shoes fitting the identified brand-specific size according to each category with reference to the inventory status table. Here, the identification unit 1015 extracts shoes fitting a brand-specific size according to each category in a state in which the shoes are being worn by the consumer.

Subsequently, the list data generation unit 1016 generates a video of list data in which the extracted shoe image data is arranged according to each category (step S111). Also, the list data display control unit 1017 causes a product list screen that is the generated video of the list data to be displayed on the display screen of the display unit 217 (step S112).

Figure 8:
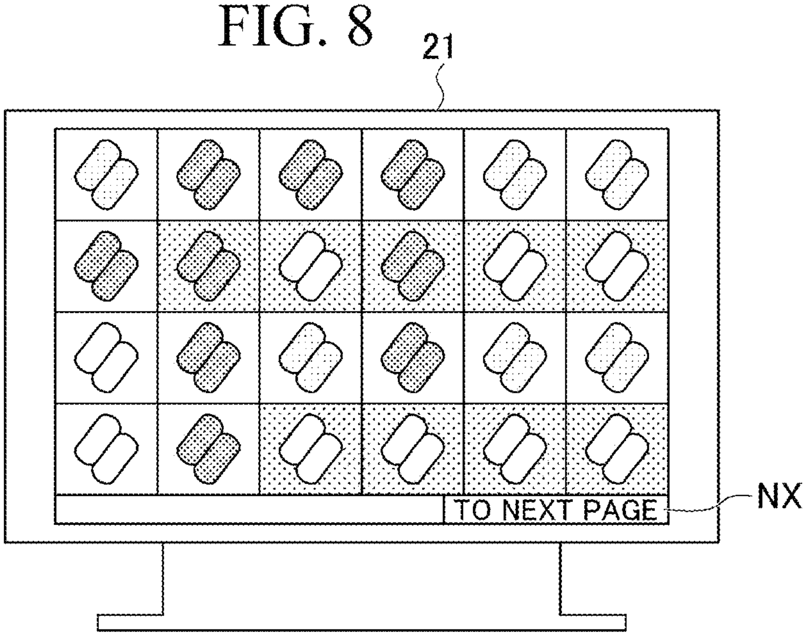
FIG. 8 is an image diagram showing an example of a product list screen according to the embodiment of the present invention.

FIG. 8 is an image diagram showing an example of a product list screen in the embodiment of the present invention.

List data in which images of shoes that are products in the store's inventory and fit the consumer's foot size are arranged in a display mode for each category is displayed on the product list screen. The consumer can select a favorite product that the consumer wants to purchase from the displayed list with a touch input manipulation on the product list screen.

For example, the list data display control unit 1017 causes a list of products to be displayed by performing a color-coding process for categories such as white for sneakers, light green for running, and purple for business. Alternatively, the list data display control unit 1017 may cause the list data to be displayed in any way according to the sales policy of the store such as recommendation order or popularity order for each brand. Alternatively, the list data display control unit 1017 may identify a category of shoes that the consumer is currently wearing from imaged consumer shoe information and preferentially display the shoes of the identified category. Moreover, when the extracted shoes do not fit on one screen, the list data display control unit 1017 creates a plurality of pages and arranges a next button NX for transitioning to the next page. Moreover, the list data display control unit 1017 may intentionally display products that are not in the inventory and notify the consumer thereof so that they can be ordered.

The product list screen is displayed in this way, and therefore the consumer can ascertain products that are shoes that fit his or her foot size and are in the inventory in the store just by getting on the measurement device 30. That is, consumers can easily ascertain the inventory status of shoes that fit their feet without having to contact store clerks. Moreover, because the consumer can measure the foot size with the measurement device 30 while wearing shoes, the trouble of taking off the shoes can be saved. For example, the consumer can cause a product list screen to be displayed simply by entering the store and standing in front of the digital signage device 20.

Figure 9:
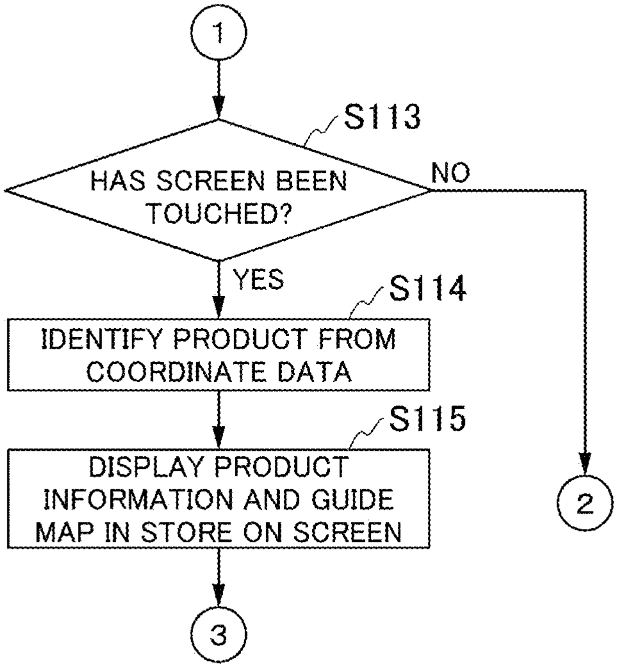
FIG. 9 is a flowchart showing an operation of a guide display process executed by the display system according to the embodiment of the present invention.

FIG. 9 is a flowchart showing an operation of a guide display process executed by the display system in an embodiment of the present invention. The information processing device 10 executes the process shown in FIG. 9 subsequent to the processing of step S112 described above.

The list data display control unit 1017 determines whether or not the product list screen has been touched by the consumer (step S113). When the display screen of the display unit 217 has been touched, the touch sensor 216 of the display device 21 transmits coordinate data indicating a touched position to the information processing device 10. When the list data display control unit 1017 receives the coordinate data from the touch sensor 216, it is determined that the product list screen has been touched. When the product list screen has not been touched (step S113: No), the process proceeds to the processing of step S118 to be described below.

On the other hand, when the product list screen has been touched (step S113: Yes), the guide display control unit 1019 identifies shoes selected by the consumer from the touched coordinate data (step S114). Also, the guide display control unit 1019 causes the display unit 217 to display a guide screen indicating product information about the shoes selected by the consumer and a guide for a display area where the shoes are displayed (step S115).

Figure 10:
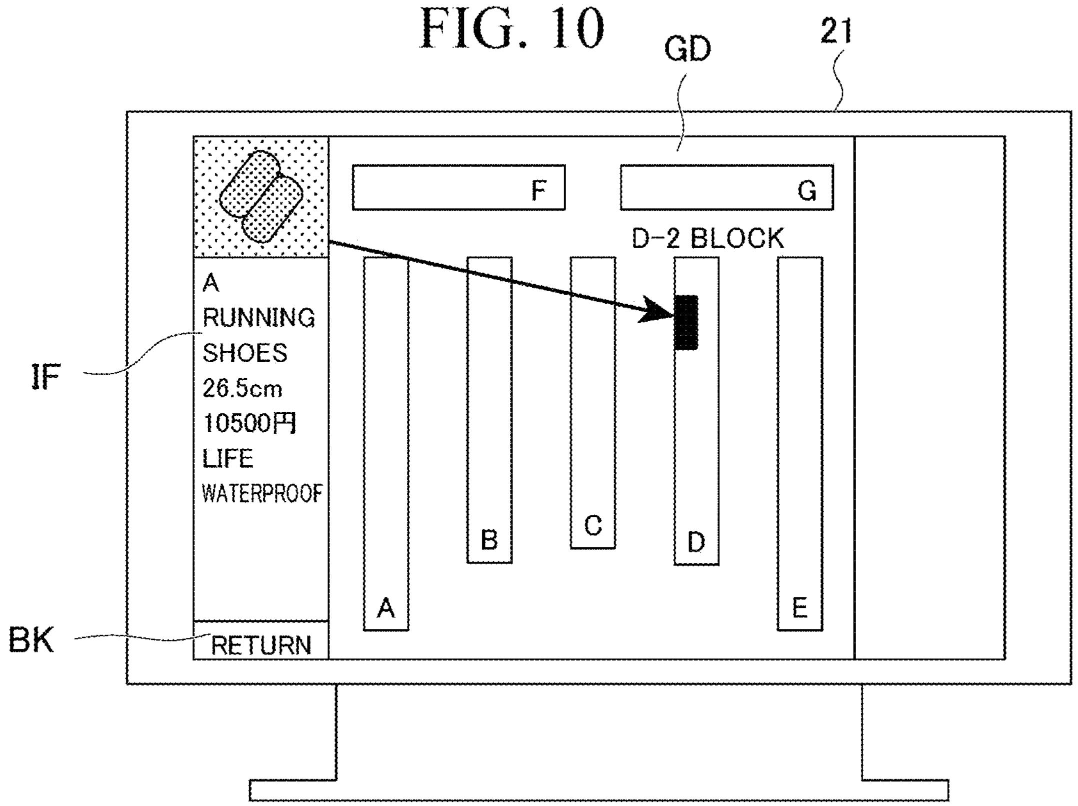
FIG. 10 is an image diagram showing an example of a guide screen according to the embodiment of the present invention.

FIG. 10 is an image diagram showing an example of a guide screen in the embodiment of the present invention.

In the guide screen shown in FIG. 10, product information IF about a product selected by a consumer from a product list screen, a guide GD for a display area where the product is displayed, and a back button BK for returning to the product list screen are displayed. In the example shown in FIG. 10, the brand "A," the category "running shoes," the size "26.5 cm," the price "10500 yen," and the function "life waterproof" are displayed as the product information IF. Moreover, in the guide GD, the display area in which the product is displayed on a layout map in a store is indicated by an arrow from a product image. Also, the name "D-2 block" of the display area where the product is displayed is displayed in the guide GD.

The guide screen is displayed in this way, and therefore the consumer can ascertain the display area in which the shoes selected from the product list screen are displayed without having to contact the clerk or wander around the store. Therefore, the consumer can quickly move to a place where a desired product to be purchased is displayed.

Also, when the product is in a box in the display area without being displayed in the display area, the guide display control unit 1019 may provide a guide indicating that the product is in the box in the display area. Therefore, because the consumer can ascertain that the product is in the box, it is possible to reduce the time and effort of searching for the product after arriving at the display area.

Figure 11:
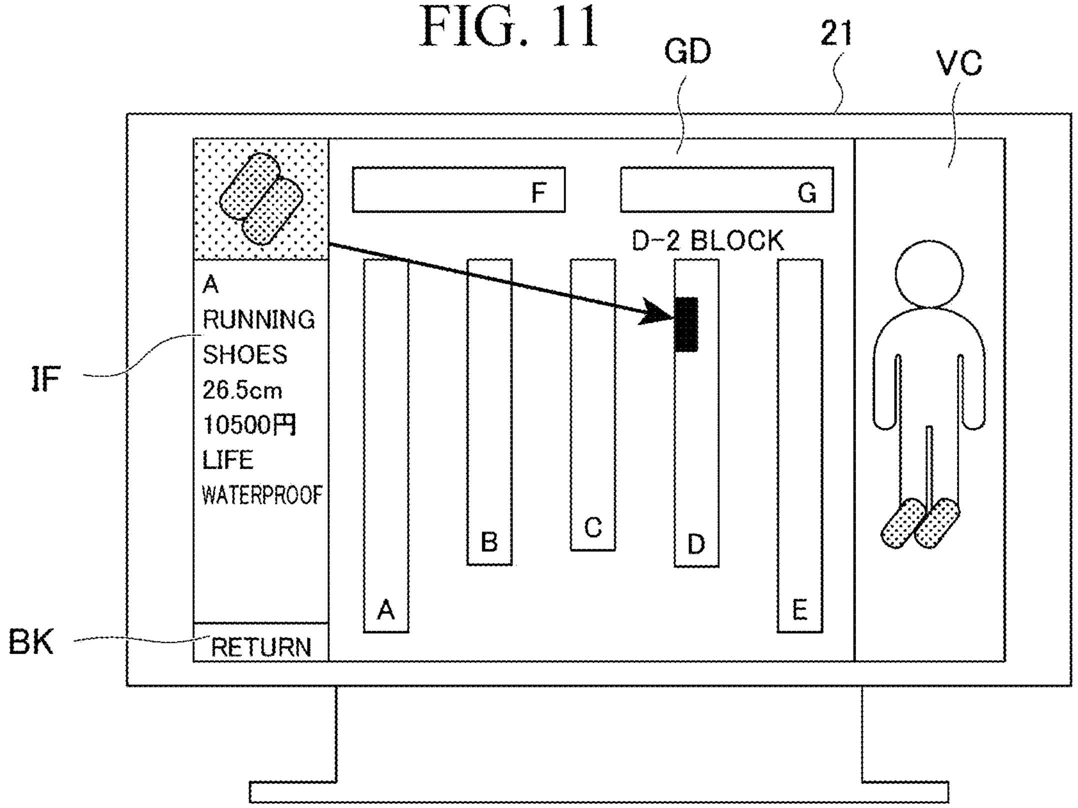
FIG. 11 is an image diagram showing another example of the guide screen according to the embodiment of the present invention.

FIG. 11 is an image diagram showing another example of the guide screen in an embodiment of the present invention.

In the guide screen shown in FIG. 11, in addition to the displayed content of the guide screen shown in FIG. 10, the consumer's virtual coordinate VC is displayed. In a whole-body image of the consumer captured by the second imaging device 23, the guide display control unit 1019 texture-maps an image of a selected product onto the consumer's shoes and causes the virtual coordinate VC to be displayed. The virtual coordinate VC may be a still image of the consumer captured at a moment or may be a moving image for dynamically performing a texture mapping process according to the consumer's movement.

Figure 12:
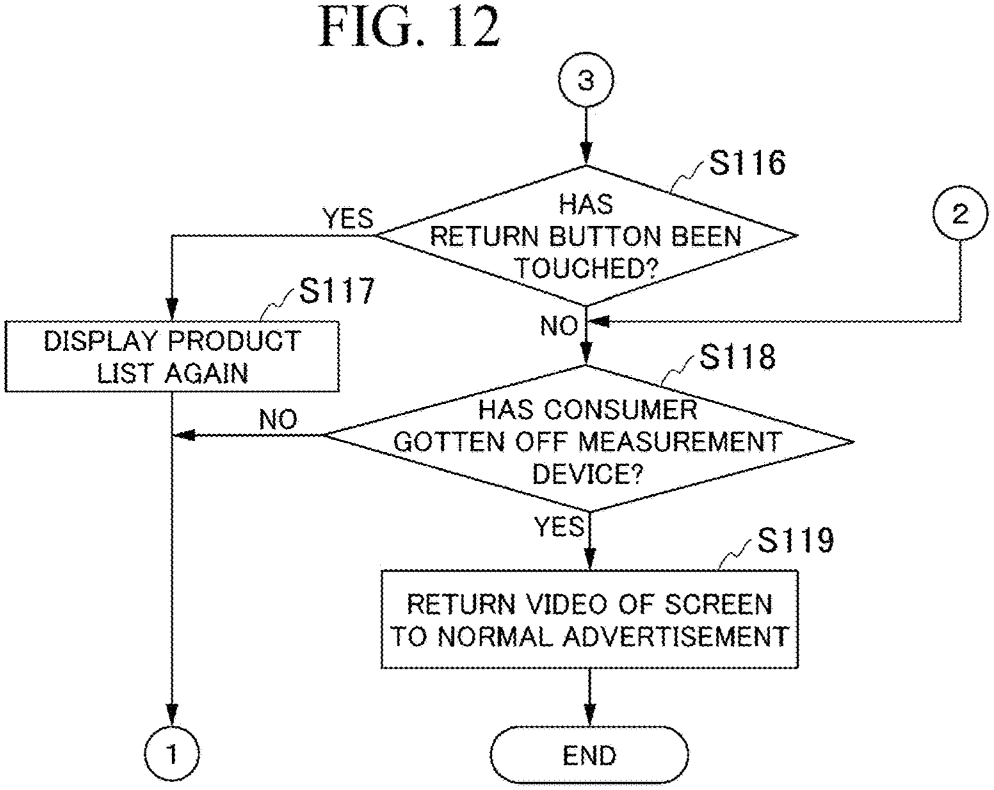
FIG. 12 is a flowchart for describing an operation of a content display process executed by the display system according to the embodiment of the present invention.

FIG. 12 is a flowchart for describing an operation of a content display process executed by the display system in the embodiment of the present invention. The information processing device 10 executes the process shown in FIG. 12 subsequent to the processing of step S115 described above.

The guide display control unit 1019 determines whether or not the back button for returning to the product list screen has been touched by the consumer on the displayed guide screen (step S116). When the back button has been touched (step S116: Yes), the list data display control unit 1017 returns the display of the display unit 217 to the product list screen (step S117) and the process returns to the processing of step S113.

On the other hand, when the back button has not been touched (step S116: No), the content display control unit 1010 determines whether or not the consumer has gotten off the measurement device 30 on the basis of a signal received from the measurement device 30 (step S118). When the measurement device 30 detects that the consumer has gotten off the measurement device 30 with the sensor, a signal indicating that the consumer has gotten off the measurement device 30 is transmitted to the information processing device 10. When the consumer has not gotten off the measurement device 30 (step S118: No), the process returns to the processing of step S113.

On the other hand, when the consumer has gotten off the measurement device 30 (step S118: Yes), the content display control unit 1010 returns a video of the screen displayed on the display unit 217 to content of a normal advertisement (step S119). That is, when the display unit 217 is displaying the product list screen or the guide screen, the content display control unit 1010 returns the display of the display unit 217 to the advertisement content if the consumer gets off the measurement device 30. Subsequently, the process is completed, and it waits until the next consumer gets on the measurement device 30.

Thus, the display system 1 according to the present embodiment includes the measurement device 30 configured to measure a size of shoes worn by a consumer, the size acquisition unit 1011 configured to acquire a size of shoes worn by the consumer from the measurement device 30, the brand acquisition unit 1013 configured to acquire a brand of shoes of the measured shoe size, the extraction unit 1014 configured to extract a foot size corresponding to a combination of the measured shoe size of the consumer and the acquired brand with reference to a data table in which brand-specific shoes and foot sizes are shown, the identification unit 1015 configured to identify at least a shoe size of a brand different from the acquired brand, the shoe size corresponding to the extracted foot size, the list data generation unit 1016 configured to generate the identified brand-specific shoe size and brand-specific shoe list data, and the list data display control unit 1017 configured to cause the display unit 217 to display the generated list data.

According to this configuration, it is possible to identify a shoe size fitting the consumer's foot size according to each brand and display a list of shoes of the identified size. That is, a list of shoes fitting the consumer's foot size can be automatically displayed simply by the consumer getting on the measurement device 30. Therefore, consumers can easily ascertain which shoes fit their foot sizes without having to know the size of shoes of each brand fitting their feet and without having to contact the store clerk. Moreover, because the measurement device 30 measures the size of the shoes worn by the consumer, the consumer can ascertain the shoes that fit his or her size simply by getting on the measurement device 30 while wearing the shoes. That is, when the customer gets on the measurement device 30, the time and effort of taking off shoes can be saved, which is convenient for the consumer.

Moreover, the display system 1 includes the guide display control unit 1019 configured to cause the display unit 217 to display a guide for a display area where shoes selected by the consumer from the list data are displayed. Thereby, it is possible to guide the consumer to a place where the shoes selected by the consumer are displayed. In other words, the consumer can simply select his or her favorite shoes from the list and ascertain the display area in which the shoes are displayed. Therefore, the consumer can quickly reach a place where a product the customer wants to purchase is displayed without having to contact the store clerk and it is possible to simplify a process in which the consumer tries the product on.

Moreover, the display system 1 includes the first captured-image acquisition unit 1012 configured to acquire an image by imaging shoes worn by a consumer and the brand acquisition unit 1013 acquires a brand of the shoes on the basis of the image obtained by imaging the shoes worn by the consumer. Thereby, the brand of the shoes can be acquired automatically without a manipulation input received from the consumer.

Moreover, the measurement device 30 is installed in a store that sells shoes and the list data generation unit 1016 generates list data of the shoes in the inventory of the store. Thereby, shoes that fit the foot size of the consumer and are in inventory in the store can be presented to the consumer.

Moreover, the size acquisition unit 1011 is able to acquire a foot size of a consumer from the measurement device 30 instead of a shoe size of the consumer and the identification unit 1015 identifies a brand-specific shoe size corresponding to the acquired foot size when the foot size of the consumer has been acquired. Thereby, because the foot size of the consumer can be measured directly with the measurement device 30, the foot size of the consumer can be identified more accurately.

Moreover, the display system 1 includes the second captured-image acquisition unit 1018 configured to acquire an image by imaging the whole body of a consumer and the guide display control unit 1019 configured to display an image obtained by mapping an image of shoes selected by the consumer from list data to the image obtained by imaging the whole body of the consumer. Thereby, the virtual coordinate of the selected shoes can be displayed on the display unit 217.

Moreover, the list data display control unit 1017 displays shoe list data in a display mode differing according to each category. Thereby, it is possible to present a category to which each shoe in the list belongs to the consumer in an easy-to-understand way.

Moreover, the display unit 217 is digital signage and the content display control unit 1010 configured to cause the display unit 217 to display content of advertisements when there is no consumer on the measurement device 30 is provided. Thereby, for example, it is possible to encourage consumers to purchase products by displaying content of advertisements for products in stores.

Although a case where the above-described display device 21 is digital signage has been described, the function of the display device 21 may be installed in a terminal device used by the consumer. The terminal device used by the consumer may be a smartphone, a tablet, a mobile phone, or the like. Thereby, the terminal device carried by the consumer is used in the store, and therefore the consumer can implement the same function as the display device 21 in the terminal device by using his or her terminal device even if the display device 21 is used by another consumer.

Figure 13:
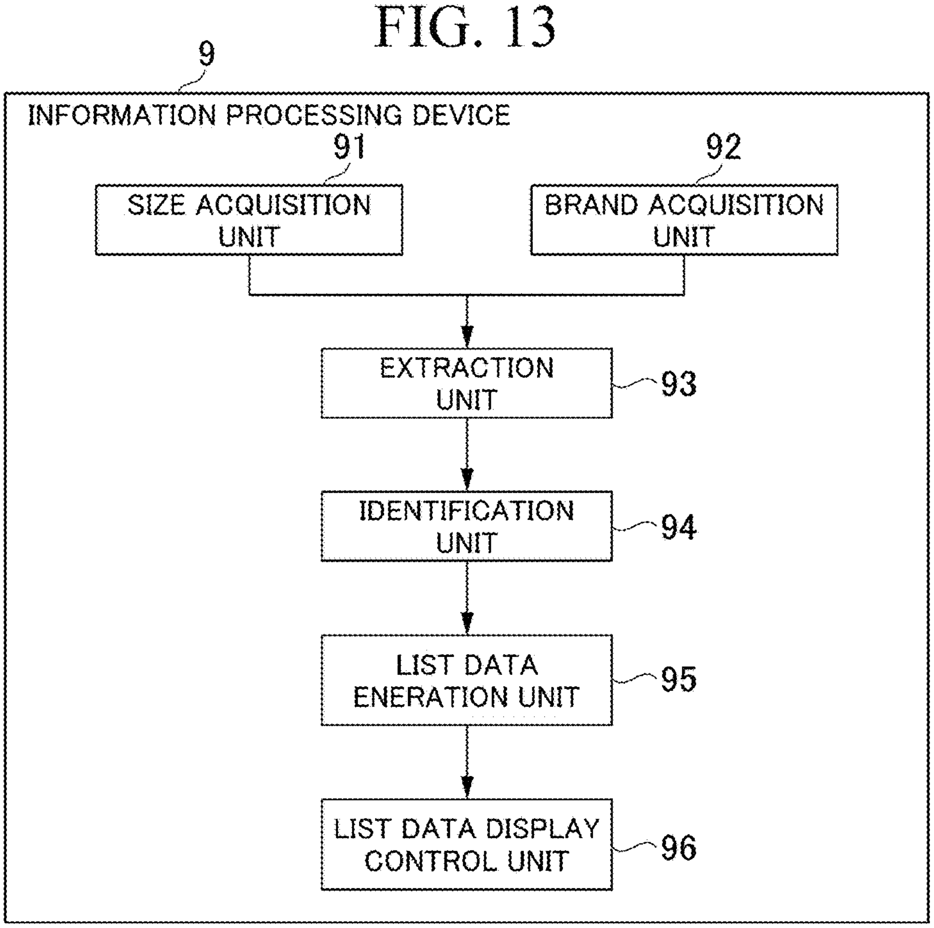
FIG. 13 is a diagram showing an example of a configuration according to another aspect of the information processing device of the present invention.

FIG. 13 is a diagram showing an example of a configuration according to another aspect of the information processing device of the present invention.

An information processing device 9 shown in FIG. 13 includes a size acquisition unit 91, a brand acquisition unit 92, an extraction unit 93, an identification unit 94, a list data generation unit 95, and a list data display control unit 96.

The size acquisition unit 91 acquires a measurement result from a measurement device configured to measure a shoe size.

The brand acquisition unit 92 acquires a brand of shoes whose size has been measured by the measurement device.

The extraction unit 93 extracts a foot size corresponding to a combination of a measurement result of measuring a size of shoes worn by the consumer and the acquired brand with reference to a data table in which brand-specific shoes and foot sizes are shown.

The identification unit 94 identifies the shoe size corresponding to the extracted foot size according to each brand.

The list data generation unit 95 generates brand-specific shoe list data on the basis of a result of identifying a brand-specific shoe size in the identification unit 94.

The list data display control unit 96 causes the display unit to display the generated list data.

Moreover, the list data display control unit 96 causes the display unit to display at least one of the brand-specific shoe size identified by the identification unit 94 and the list data generated by the list data generation unit 95.

Here, the case where the information processing device 9 includes the size acquisition unit 91, the brand acquisition unit 92, the extraction unit 93, the identification unit 94, the list data generation unit 95, and the list data display control unit 96 has been described. However, a configuration in which the size acquisition unit 91, the brand acquisition unit 92, the extraction unit 93, and the identification unit 94 are provided and the list data generation unit 95 and the list data display control unit 96 are not provided may be adopted. Here, the identification unit 94 may externally output data representing the shoe size identified for each brand. An external device may be, for example, a consumer terminal device or the display device 21.

Moreover, a program for implementing functions of the image processing device, the digital signage device, or the measurement device in FIG. 1 is recorded on a computer-readable recording medium, and the program recorded on the recording medium may be read into a computer system and executed to perform position detection. The "computer system" used here is assumed to include an operating system (OS) or hardware such as peripheral devices.

Moreover, the "computer system" is assumed to include a homepage provision environment (or display environment) if a WWW system is used.

Moreover, the "computer-readable recording medium" refers to a flexible disk, a magneto-optical disc, a read-only memory (ROM), a portable medium such as a compact disc-ROM (CD-ROM), or a storage device such as a hard disk embedded in the computer system. Furthermore, the "computer-readable recording medium" is assumed to include a medium that holds a program for a certain period of time, such as a volatile memory inside a computer system serving as a server or a client. Moreover, the above-described program may be a program for implementing some of the above-described functions. Further, the above-described function may be implemented in combination with a program already recorded on the computer system. Moreover, the above-described program may be stored in a predetermined server, and the program may be distributed (downloaded or the like) via a communication circuit in response to a request from another device.

Although embodiments of the present invention have been described in detail above with reference to the drawings, specific configurations are not limited to the embodiments and other designs and the like may also be included without departing from the scope of the present invention.

For example, in the above-described embodiment, the consumer selects a desired product to be purchased by touching the product list screen. However, the technology for selection is not limited to this, and any means capable of acquiring information indicating that the consumer has intentionally selected a specific product, such as a remote control or a line-of-sight sensor, may be used.

REFERENCE SIGNS LIST

1 Display system
9, 10 Information processing device
101 Control unit
1010 Content display control unit
1011, 91 Size acquisition unit
1012 First captured-image acquisition unit
1013, 92 Brand acquisition unit
1014, 93 Extraction unit
1015, 94 Identification unit
1016, 95 List data generation unit
1017, 96 List data display control unit
1018 Second captured-image acquisition unit
1019 Guide display control unit
102 Calculation unit
103 Image processing unit
104 Image analysis unit
105 Communication unit
106 Content extraction unit
107 Content storage unit
108 Data management unit
20 Digital signage device
21 Display device
211 Control unit
212 Communication unit
213 Image processing unit
214 Image analysis unit
215 Calculation unit
216 Touch sensor
217 Display unit
22 First imaging device
221 Control unit
222 Imaging unit
223 Image processing unit
224 Communication unit
23 Second imaging device
30 Measurement device
301 Control unit
302 Imaging unit
303 Image processing unit
304 Communication unit

What is claimed is:

1. A display system comprising:
an information processing device;
a digital signage device including: a display device, a first imaging device; and a second imaging device; and
a measurement device,
the information processing device, the digital signage device and the measurement device are communicatively connected to each other;
the display device includes: a display unit having a display screen for displaying a video based on a video signal input from the information processing device;

and a touch sensor installed on the display screen; the touch sensor being configured to transmit, to the information processing device, coordinate data indicating a position on the display screen, when the touch sensor receives a touch manipulation on the display screen, the first imaging device is configured to image shoes worn by a consumer, when the consumer has gotten on the measurement device, to generate a first captured-image;

the first imaging device is configured to transmit the first captured-image as generated to the information processing device;

the second imaging device is configured to image a whole body of the consumer, when the consumer has gotten on the measurement device, to generate a second captured-image;

the second imaging device is configured to transmit the second captured-image to the information processing device;

the measurement device includes a sensor configured to detect a foot size of consumer and to detect that the consumer has gotten on the measurement device;

the sensor includes one or more imaging devices configured to scan a sole of a consumer's foot standing on the sensor and to measure a longitudinal length and a horizontal length of the consumer's foot;

the measurement device is configured to transmit a measured size of the consumer's foot to the information processing device the information processing device comprises: a memory that stores a set of processor executable instructions, and a processor configured to execute the set of processor executable instructions to cause the processor, when executing the set of processor executable instructions, to perform:

acquiring a measurement result from a measurement device configured to measure a shoe size;

acquiring one or more brands of shoes of the shoe size measured;

extracting a respective foot size corresponding to a respective combination of the shoe size with each of the one or more brands acquired, with reference to a data table that include a respective brand-specific set of shoe sizes and foot sizes, for each of the one or more brands;

identifying a respective brand-specific shoe size which corresponds to the respective foot size extracted, for each of the one or more brands;

generating a respective set of brand-specific shoe list data, for each of the one or more brands, on a basis of the respective brand-specific shoe size identified;

causing the display unit to display at least one of: the respective brand-specific shoe size identified; and the respective set of brand-specific shoe list data generated;

causing the display unit to display a guide for a display area where a set of shoes selected by a by consumer from the respective set of brand-specific shoe list data; and causing the display unit to display a mapped image obtained by mapping the consumer-whole-body image with a consumer-selected shoe image of a selected set of shoes that is selected by the consumer from the respective set of brand-specific shoe list data.

2. The information processing device according to claim 1, wherein the shoe size is measured by the measurement device, while the shoes are being worn, and wherein the foot size is extracted by the extraction unit, while the shoes are being worn.

3. The information processing device according to claim 1, wherein the measurement device is installed in a store that sells shoes, and wherein generating the respective set of brand-specific shoe list data comprises generating the respective set of brand-specific shoe list data for shoes in an inventory of the store.

4. The information processing device according to claim 1, wherein the processor further performs:

acquiring a captured-image of a set of shoes worn by a consumer, and acquiring the brand of the set of shoes on a basis of the captured-image of the set of shoes worn by the consumer.

5. The information processing device according to claim 1, wherein the processor further performs:

acquiring a consumer foot size of a consumer from the measurement device, instead of a shoe size of the consumer, and identifying a respective brand-specific shoe size which corresponds to the consumer foot size acquired in case that the consumer foot size is acquired.

6. The information processing device according to claim 1, wherein the display unit displays the respective set of brand-specific shoe list data in a respective different display mode for each category.

7. The information processing device according to claim 1, wherein the display unit is digital signage, and wherein the information processing device comprises a content display control unit configured to cause the display unit to display content of advertisements in case that any consumer is absent on the measurement device.

* * * * *